United States Patent
Inoue et al.

(10) Patent No.: US 7,818,123 B2
(45) Date of Patent: Oct. 19, 2010

(54) ROUTING GUIDE SYSTEM AND METHOD

(75) Inventors: Hiroto Inoue, Tsurugashima (JP);
Ryujiro Fujita, Tsurugashima (JP);
Naohiko Ichihara, Tsurugashima (JP);
Takehiko Shioda, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 1055 days.

(21) Appl. No.: 10/594,903

(22) PCT Filed: Mar. 15, 2005

(86) PCT No.: PCT/JP2005/005041
§ 371 (c)(1),
(2), (4) Date: Sep. 29, 2006

(87) PCT Pub. No.: WO2005/098364
PCT Pub. Date: Oct. 20, 2005

(65) Prior Publication Data
US 2007/0276589 A1    Nov. 29, 2007

(30) Foreign Application Priority Data
Mar. 31, 2004    (JP) ............................. 2004-104387

(51) Int. Cl.
*G01C 21/36* (2006.01)
*G01C 21/34* (2006.01)
(52) U.S. Cl. .................. 701/211; 701/200; 701/208; 701/213; 340/995.27; 340/995.24; 340/993; 342/357.09; 455/556.1; 382/103; 382/224
(58) Field of Classification Search ................ 701/206; 340/995.22, 995.28, 995.27
See application file for complete search history.

(56) References Cited

U.S. PATENT DOCUMENTS 7,499,799 B2 * 3/2009 Park .......................... 701/208

(Continued)

FOREIGN PATENT DOCUMENTS

JP    9-304101    11/1997

(Continued)

OTHER PUBLICATIONS

International Search Report dated Jun. 28, 2005.

*Primary Examiner*—Thomas G Black
*Assistant Examiner*—Lin B Olsen
(74) *Attorney, Agent, or Firm*—McGinn IP Law Group, PLLC

(57) ABSTRACT

A routing guide system has memory means provided outside a mobile body for storing data of images at a plurality of guide points. The routing guide system also has distance measuring means for measuring the distance from the current position of the mobile body to the next guide point. The routing guide system also has image request generation means for generating an image request for the next guide point when the distance measured by the distance measuring means is not more than a first predetermined distance. The routing guide system also has transmission means provided outside the mobile body for reading from the memory means an image of the next guide point in response to the image request and for transmitting that image to the mobile body. The routing guide system also has display control means for causing the mobile body to receive the image transmitted from the transmission means and causing a display device to display the image.

11 Claims, 5 Drawing Sheets

U.S. PATENT DOCUMENTS

| | | | |
|---|---|---|---|
| 7,630,737 B2 * | 12/2009 | Pande et al. | 455/556.1 |
| 2003/0208315 A1 * | 11/2003 | Mays | 701/211 |
| 2004/0249565 A1 * | 12/2004 | Park | 701/200 |
| 2007/0055441 A1 * | 3/2007 | Retterath et al. | 701/200 |
| 2007/0061076 A1 * | 3/2007 | Shulman | 701/213 |
| 2008/0051997 A1 * | 2/2008 | Rosenberg | 701/211 |
| 2008/0319640 A1 * | 12/2008 | Fujita et al. | 701/200 |
| 2009/0240431 A1 * | 9/2009 | Chau et al. | 701/208 |

FOREIGN PATENT DOCUMENTS

| | | |
|---|---|---|
| JP | 11-72344 | 3/1999 |
| JP | 2000-304559 A | 11/2000 |
| JP | 2003-269971 | 9/2003 |

* cited by examiner

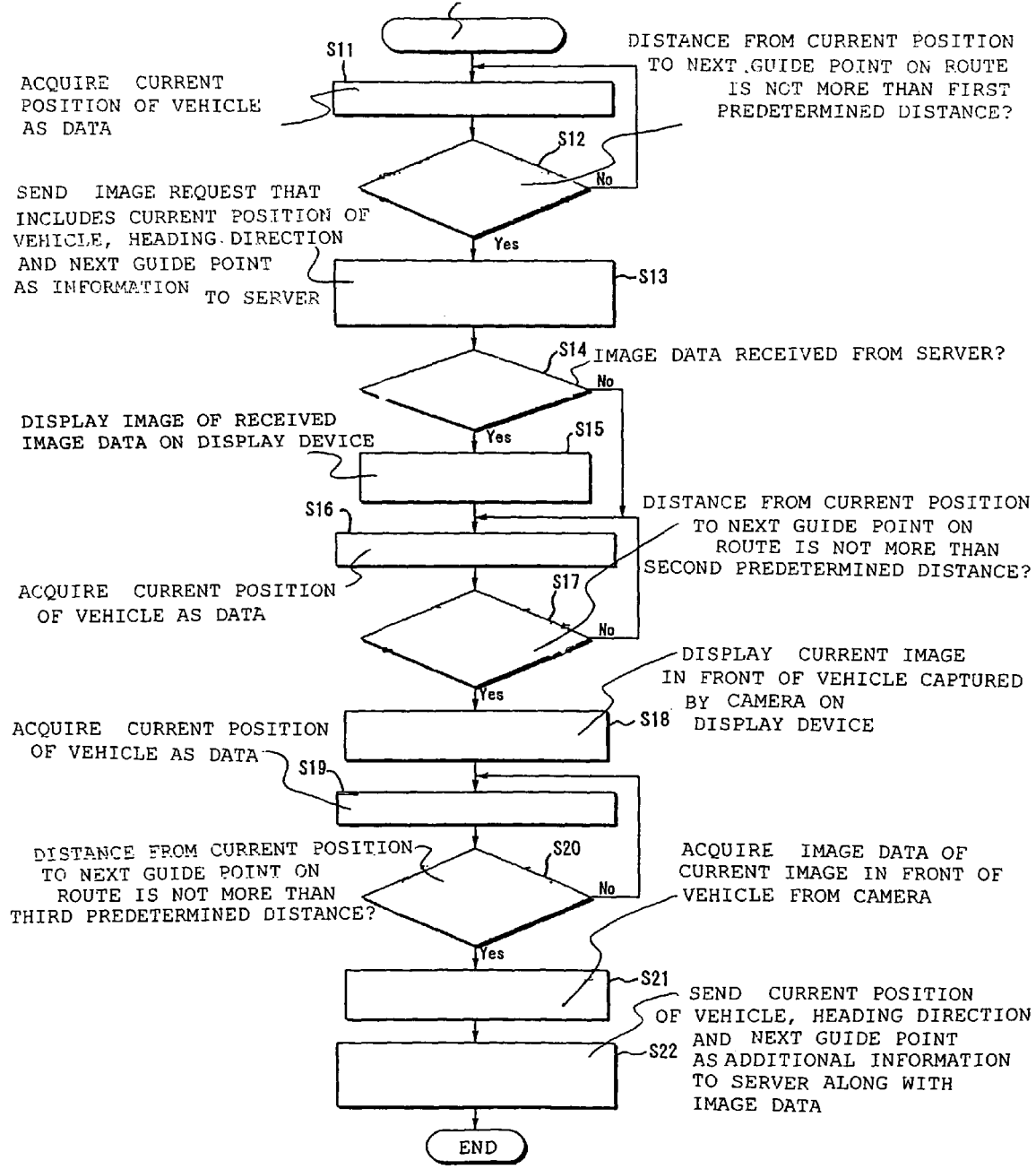

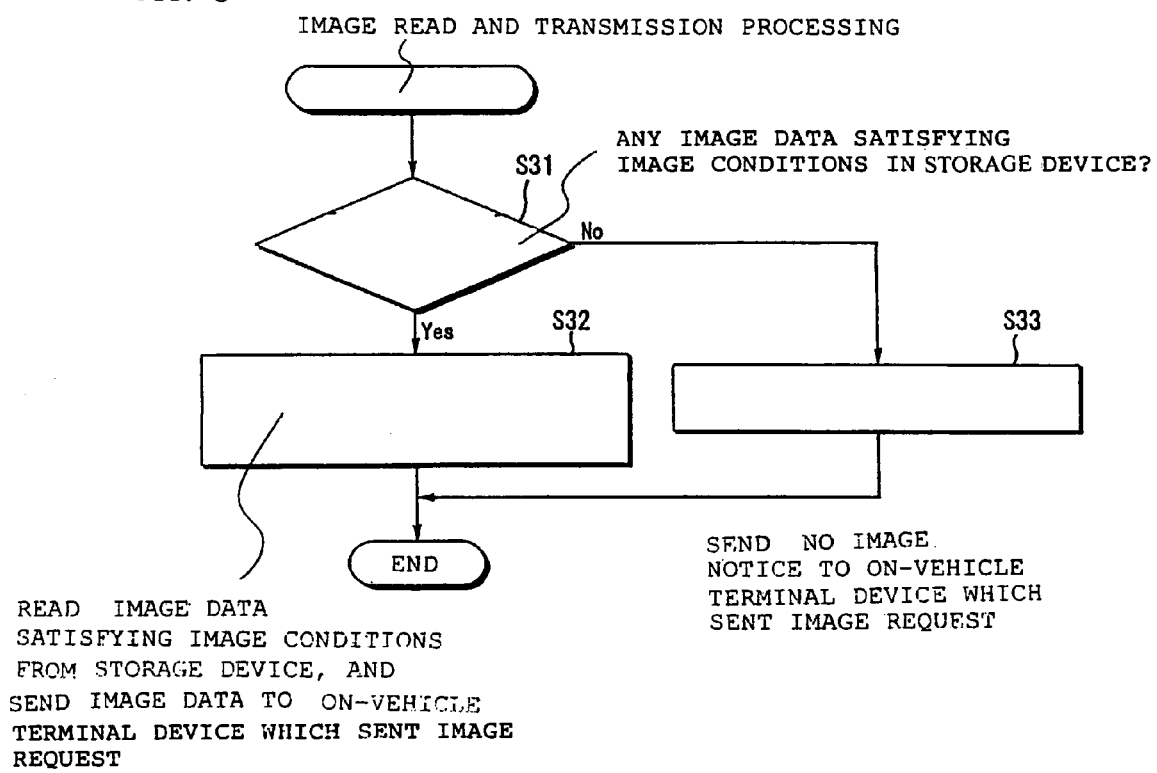

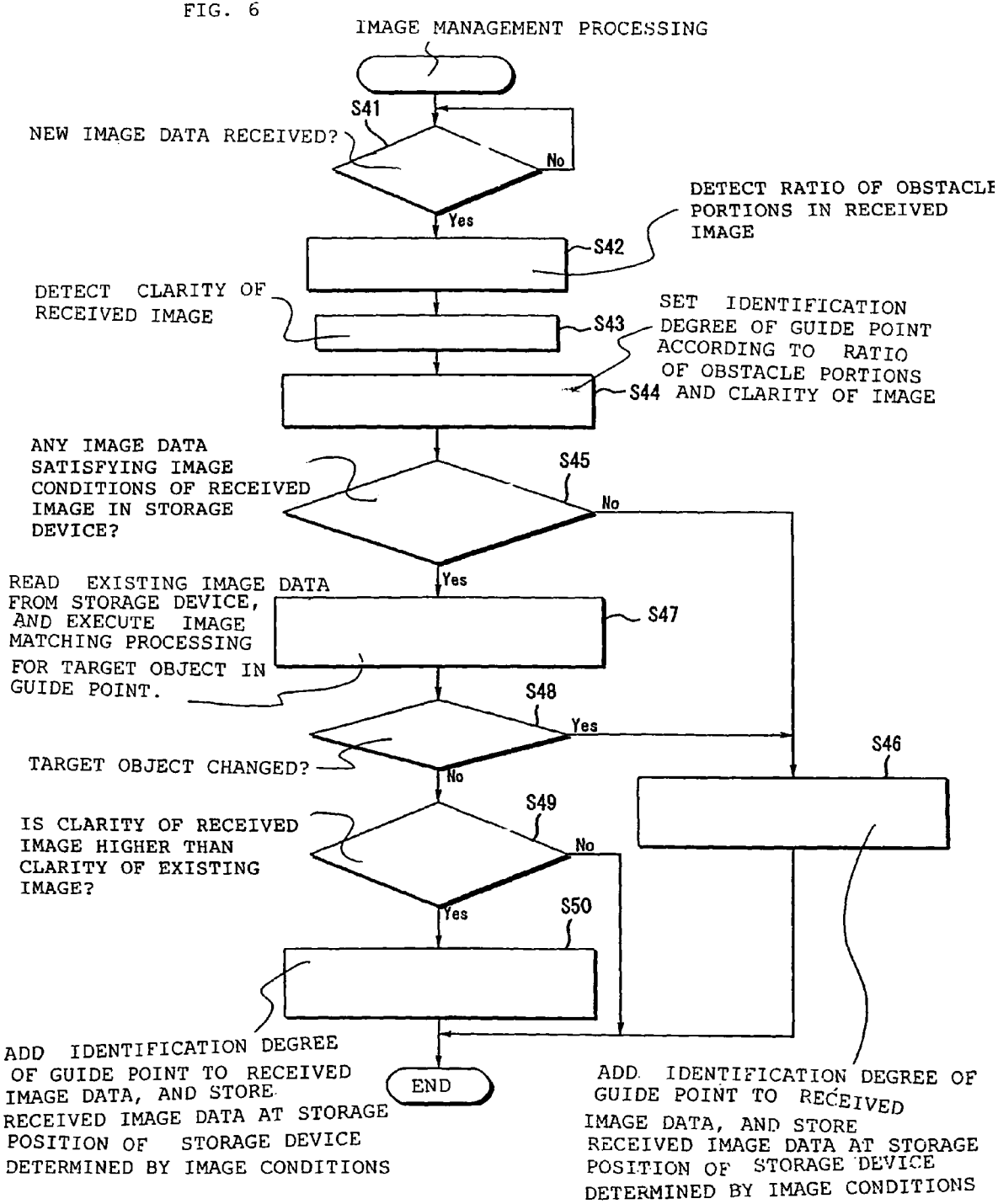

ROUTING GUIDE SYSTEM AND METHOD

TECHNICAL FIELD

The present invention relates to a routing guide system and method for guiding a mobile body, such as a vehicle, through traveling routes to a destination.

BACKGROUND ART

Navigation systems are already known. In general, map data, including road data, acquired by digitizing each point on a road of a map, is stored in a storage device in advance. A map data group which covers a predetermined size of area including the current position of the vehicle is read from the storage device while detecting the current position and heading direction of the vehicle using various sensors. The map data group is then displayed on a screen of the display device as a map of the area around the current position of the vehicle. The vehicle mark is automatically displayed on the map to indicate the current position and heading direction of the vehicle.

Conventional navigation devices have a function to automatically set the route to the destination. When a route is set, one route is selected out of a plurality of route candidates based on computation considering various conditions, such as the presence of a toll road and the shortest distance, on the routes between the start point, the destination and transit locations, and the selected route is displayed on the map.

The navigation device disclosed in Japanese Patent Application Kokai (Laid-Open) No. 2003-269971 has a camera mounted on a vehicle. This camera captures the image in front of the vehicle when the vehicle approaches a guide point, such as a cross-section, on the route. The captured image is displayed on the display device.

If a driver can know the status of a guide point on a new route by image before the vehicle approaches this guide point, this helps the driver to drive comfortably. This is also comfortable to passengers in the vehicle. However, there are many guide points, such as cross-sections, and the status of the guide points often changes due to construction of the guide points and the peripheral areas. Thus, the conventional car navigation device must have a large storage capacity of an image. In other words, it is difficult, at low cost, to display the image of a guide point before the vehicle approaches the guide point.

Such a problem also exists in a navigation system for pedestrians, because the navigation system provides a pedestrian with the image of a point on a traveling road which the pedestrian is approaching.

SUMMARY OF THE INVENTION

One object of the present invention is to provide a routing guide system and method that can display an image of a guide point before a mobile body approaches the guide point, using a low cost device for use with the mobile body.

According to the first aspect of the present invention, there is provided a routing guide system for displaying an image of a predetermined guide point on a traveling road of a mobile body. This routing guide system includes: storage means installed outside the mobile body for storing images of a plurality of guide points as data; distance detection means for detecting a distance from a current position of the mobile body to a next guide point; and image request generation means for generating an image request for the next guide point when the distance detected by the distance detection means becomes a first predetermined distance or less. The routing guide system further includes: transmission means installed outside the mobile body for reading the image of the next guide point from the storage means in response to the image request, and sending the image to the mobile body; and display control means for causing the mobile body to receive the image transmitted from the transmission means, so as to display the image on a display device.

According to the second aspect of the present invention, there is provided a routing guide method for displaying an image of a predetermined guide point on a traveling road of a mobile body. This routing guide method includes: a distance detection step of detecting a distance from a current position of the mobile body to a next guide point; and an image request generation step of generating an image request for the next guide point when the distance detected in the distance detection step becomes a first predetermined distance or less. The routing guide method further includes: a transmission step, provided outside the mobile body, of reading the image of the next guide point from the storage means storing images of a plurality of guide points as data in response to the image request, and sending the image to the mobile body; and a display control step of receiving, in the mobile body, the image transmitted in the transmission step, and displaying the image on a display device.

According to the third aspect of the present invention, there is provided a navigation device for use with a mobile body for displaying an image of a predetermined guide point on a traveling road of the mobile body. This navigation device includes distance detection means for detecting a distance from a current position of the mobile body to a next guide point, image request generation means for generating an image request for the next guide point when the distance detected by the distance detection means becomes a first predetermined distance or less, and display control means for receiving the image transmitted from outside the mobile body according to the image request, and displaying the image on a display device.

BRIEF DESCRIPTION OF THE DRAWINGS

FIG. 4 is a flow chart depicting the guide point image processing;

FIG. 5 is a flow chart depicting the image read and transmission processing; and FIG. 6 is a flow chart depicting image management processing.

MODE(S) FOR CARRYING OUT THE INVENTION

Embodiments of the present invention will now be described with reference to the drawings.

Figure 1:
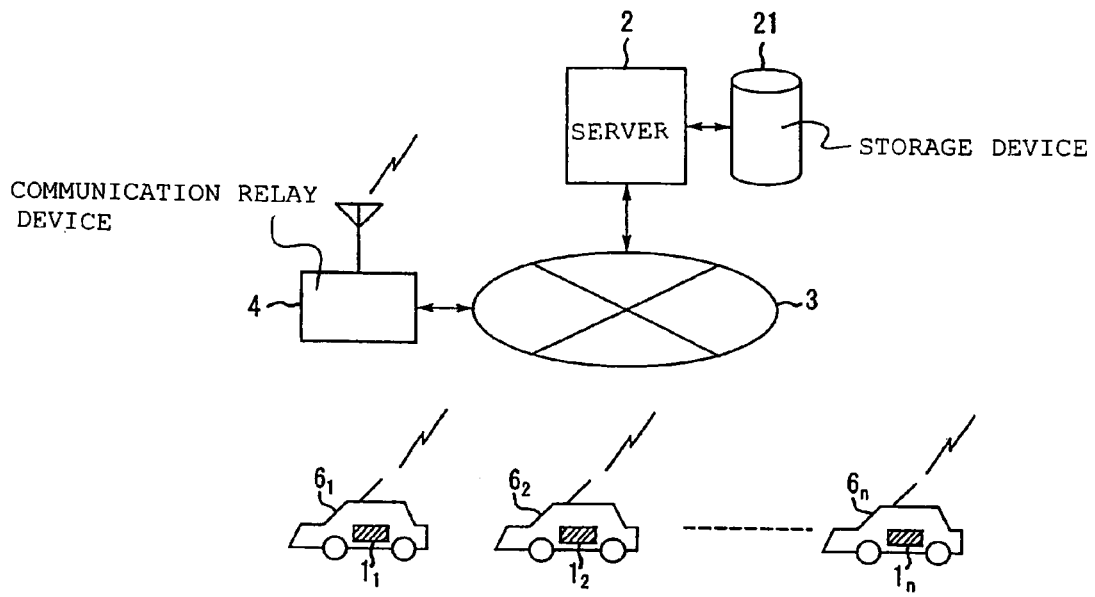
FIG. 1 is a block diagram depicting a general configuration of the routing guide system according to the present invention.

Referring to FIG. 1, the routing guide system of this embodiment includes a plurality of on-vehicle terminal devices $1_1$-$1_n$, server 2, network 3 and communication relay device 4. The on-vehicle terminal devices $1_1$-$1_n$ and the server 2 are connected to each other via the network 3 and the communication relay device 4 so that they can communicate with each other.

Figure 2:
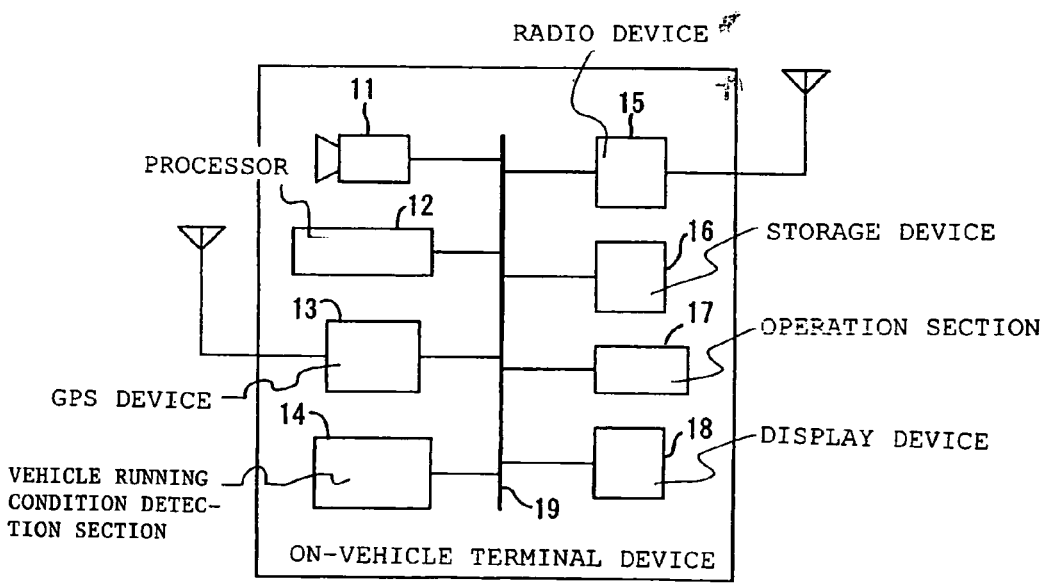
FIG. 2 is a block diagram depicting a configuration of the on-vehicle terminal device.

Each of the on-vehicle terminal devices $1_1$-$1_n$ is a navigation device which is mounted on the vehicle $6_1$-$6_n$, and is able to communicate with the server 2. As shown in FIG. 2, each of the on-vehicle terminal devices $1_1$-$1_n$ includes a camera 11, processor 12, GPS (Global Positioning System) device 13, vehicle traveling condition detection section 14, radio device 15, storage device 16, operation section 17 and display device 18. The camera 11, processor 12, GPS device 13, vehicle traveling condition detection section 14, radio device 15, storage device 16, operation section 17 and display device 18 are connected with each other by the bus 19.

The camera 11 is, for example, a CCD camera, and is mounted on the vehicle so as to capture the image in front of the vehicle.

The processor 12 receives image data which is supplied from the camera 11, and performs the image processing on a guide point indicated by the image data. The processor 12 also performs navigation processing according to the detection outputs of the GPS device 13 and vehicle traveling condition detection section 14, and performs the route setting processing. The detail of the guide point image processing and the route setting processing will be described later.

The GPS device 13 detects the current position and the heading direction of the vehicle. The vehicle traveling condition detection section 14 detects the traveling status of the vehicle, such as the vehicle speed and the engine revolution speed. The current position and the heading direction detected by the GPS device 13 and each data on the traveling status detected by the vehicle traveling condition detection section 14 are used for the guide point image processing and the navigation processing by the processor 12.

The radio device 15 receives and demodulates the radio signals sent from the server 2, and outputs the demodulated signals. The radio device 15 also transmits the data to the server 2 in the form of radio signals.

The storage device 16 includes a hard disk and a semiconductor memory. The storage device 16 stores the programs for the route setting processing and the navigation processing to be executed by the processor 12, and data, such as the road data for searching a route and map data for display.

The operation section 17 is a keyboard, for example, and supplies an instruction according to the input operation to the processor 12 via the bus 19. The display device 18 is a liquid crystal display, for example, and displays a vehicle mark to indicate the current position and the heading direction of the vehicle in the navigation processing, along with the map. The display device 18 also displays the route computed by the processor 12, image captured by the camera 11, or image provided by the server 2.

The server 2 has a storage device 21, and connects to the network 3. The server 2 executes the image management processing to manage the image data sent from the on-vehicle terminal devices $1_1$-$1_n$ using the information which is attached to the image. Upon receiving an image request from the on-vehicle terminal device $1_1$-$1_n$, the server 2 performs image read and transmission processing, and sends the image data. The detail of the image management processing and the image read and transmission processing will be described later. The storage device 21 has the storage positions of the image data, classified based on the image conditions. The image conditions are vehicle position, heading direction, guide point, time, weather and season. The detail will be described later.

Now the operation of the routing guide system having the above described configuration will be described according to the processing of the processor 12 and the server 2.

Figure 3:
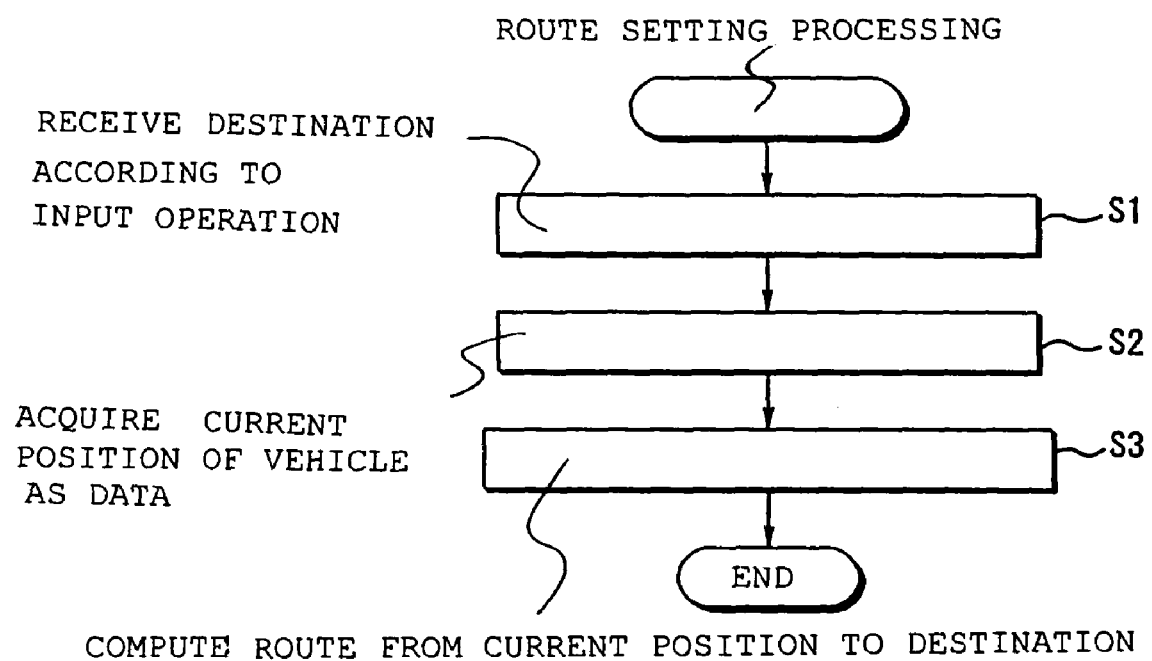
FIG. 3 is a flow chart depicting the route setting processing.

In the route setting processing, the processor 12 receives a destination according to the input operation of the operation section 17, as shown in FIG. 3 (step S1), acquires the data of the current position of the vehicle from the GPS device 13 (step S2), and computes the route from the current position to the destination (step S3). In the route computing, the route from the current position to the destination is computed according to the road data for route searching stored in the storage device 16, for example. The computed route is displayed on the display device 18, along with the map. It should be noted that the start point of the route may be another location, which is specified by the driver who operates the operation section 17, instead of the current position.

After the route is set, the vehicle starts traveling, and then the processor 12 starts the guide point image processing. In the guide point image processing, the processor 12 receives the data of the current position of the vehicle from the GPS device 13, as shown in FIG. 4 (step S11), and determines whether the distance from the current position to the next guide point on the route to the destination is within the first predetermined distance (e.g., 300 m) (step S12). Once the route to the destination is fixed, the data on the guide point on the route can be acquired from the road data, so that the judgment in step S12 is performed according to the data on the guide point. When the distance from the current position to the next guide point becomes the first predetermined distance or less, the image request, including information of the current position of the vehicle, heading direction and next guide point, is sent to the server 2 (step S13).

Upon receiving the image request, the server 2 performs image read and transmission processing, as shown in FIG. 5. In the image read and transmission processing, it is determined whether the image data that satisfies the image conditions, including current position, heading direction and guide point, indicated by the image request, is in the storage device 21 (step S31). The image data that satisfies these image conditions is the image of the road and what the driver can view when the vehicle is heading from the current position to the guide point. The image conditions also include the current time, weather and season. Time is, for example, one of four time zones, i.e., the morning (6 AM-10 PM), daytime (11 AM-4 PM), evening (5 PM-7 PM) or night (8 PM-5 AM). Weather is fine, cloudy, rain or snow, for example. Season is spring, summer, fall or winter. In the storage device 21, the additional information concerning such conditions is attached to the image data and is stored. Therefore the server 2 searches the above-mentioned additional information in the storage device 21 to determine whether image data that satisfies the image conditions is stored or not in the storage device 21. If the image data that satisfies the image conditions is found in the storage device 21, the image data is read from the storage device 21, and then sent to the on-vehicle terminal device which has issued the image request (step S32). The image data sent from the server 2 is received by the radio device 15 via the network 3 and the communication relay device 4. The radio device 15 is the one located in the on-vehicle device which has issued the image request. The image data received by the radio device 15 is supplied to the processor 12. If the image data that satisfies the image conditions is not found in the storage device 21, a no image notice, which indicates that the image data does not exist, is sent to the on-vehicle terminal device which has made the image request (step S33). The no image notice is also supplied to the processor 12 via the same communication route as the image data.

After step S13 is executed, the processor 12 determines whether the image data was received from the server 2 (step S14). For example, if the image data sent from the server 2 is received within a predetermined time after the transmission of the image request, the processor 12 displays the image of the received image data on the display device 18 (step S15). The processor 12 acquires the data of the current position of the vehicle from the GPS device 13 (step S16), and determines whether the distance from the current position to the next guide point on the route to the destination is within the second predetermined distance (e.g., 100 m) (step S17). The second predetermined distance is shorter than the first predetermined distance.

When the image data is not received within the predetermined time after sending the image request in step S14 or when the no image notice from the server 2 is received, then the processor 12 determines that image data was not received from the server 2, and immediately moves to execute step S16.

If the distance from the current position to the next guide point is the second predetermined distance or less, the current image in front of the vehicle captured by the camera 11 is displayed on the display device 18 (step S18). Therefore the display image on the display device 18 is switched from the image of the next guide point, which was the image data sent from the server 2, to the current image in front of the vehicle. This current image in front of the vehicle may be either a moving image or a still image.

Also the processor 12 acquires the data of the current position and heading direction of the vehicle from the GPS device 13 (step S19), and determines whether the distance from the current position to the next guide point on the route to the destination is within the third predetermined distance (e.g., 20 m) (step S20). The third predetermined distance is shorter than the second predetermined distance. If the distance from the current position to the next guide point is the third predetermined distance or less, the image data on the current image in front of the vehicle is loaded from the camera 11 (step S21), and the current position and heading direction of the vehicle and the next guide point are sent to the server 2 as the additional information, along with the image data (step S22). By this transmission of the image data to the server 2, guide point image processing for one guide point ends. If a next guide point still exists before the destination, the guide point image processing is repeated for that guide point. It should be noted that the additional information may include information other than those mentioned above, such as the mounting position of the camera 11 on the vehicle. The image data need not be sent to the server for each guide point, but may be collectively sent later. Data may be loaded to a recording medium in a house and sent later from the house.

The guide point is difficult to visually recognize in the image provided from the camera because of other vehicles in front and the shape of the road, unless the vehicle is near the guide point. Therefore by this guide point image processing, the scene of the guide point, saved in the storage device 21 in the server 2, is displayed at the point when the vehicle reaches the first predetermined distance, which is sufficiently distant from the guide point, such as 300 m. Thus, the driver can recognize the scene of the guide point in advance. The displayed image is switched to the image obtained from the camera mounted on the vehicle at the point when the vehicle reaches the second predetermined distance, such as 200 m from the guide point, so that the driver can reconfirm the scene by the actual image. The image displayed in advance is not a predetermined image but an image matching the status of that guide point considering season, weather and time. Thus, the driver can comprehend the status of the guide point more easily. The above-mentioned "other information" such as the mounting position of the camera on the vehicle, may be an image which represents the status of the vehicle.

By executing such guide point image processing, the image data is sent to the server 2 along with the additional information thereof by each of the on-vehicle terminal devices $1_1$-$1_n$. The server 2 executes image management processing to manage the received image data using the additional information.

Now image management processing by the server 2 will be described.

In the image management processing, it is determined whether the image data was newly received, as FIG. 6 shows (step S41). If the image data was received, the ratio of the obstacle portion in the image derived from the received image data is detected (calculated) (step S42). Obstacles are vehicles in front and parked vehicles, and do not include the landscape and the road. For example, the image data loaded this time is compared with a plurality of previous image data, and the ratio of the obstacles is computed. Also the clarity of the image of the received image data is detected (step S43). According to the ratio of the obstacle portion obtained in step S42 and the clarity of the image obtained in step S43, the identification degree of the guide point is decided (step S44). The identification degree of the guide point is set to a lower value as the ratio of the obstacle portion is higher, and is set to be a higher value as the clarity of the image is higher.

After the execution of step S44, the server 2 determines whether the image data that satisfies the image conditions, including the current position, heading direction and guide point indicated in the additional information attached to the received image data, exists in the storage device 21 (step S45). The image conditions also include the current time, weather and season. If the image data that satisfies the image conditions is not found in the storage device 21, the identification degree of the guide point is added to the received image data, and is stored in the storage position of the storage device 21, which is determined depending on the image conditions of the received image data (step S46).

If the image data that satisfies the image conditions is in the storage device 21, on the other hand, this existing image data is read from the storage device 21, and image matching processing is performed focusing on the target object(s), such as shops, in the guide point (step S47). Then it is determined whether the result of the matching processing is "no matching," that is whether the target object has changed (step S48). If the target object in the guide point has changed (e.g., a restaurant in the guide point no longer exists or a new convenience store has been built), the processing advances to step S46, where the identification degree of the guide point is added to the received image data, and the received image data is stored in the storage position of the storage device 21 which is determined depending on the image conditions. Thus, the received image data is stored in this storage position, instead of the existing image data in the storage position read in step S47.

If the objects in the guide point have not changed, it is then determined whether the clarity of the image of the received image data is higher than the clarity of the image of the existing image data (step S49). Since information on the clarity of the image is attached to the image data stored in the storage device 21, the image clarity of the existing image data is read and compared with the image clarity of the received image data for the judgment in step S49. If the clarity of the image of the received image data is higher than the clarity of the image of the existing image data, the identification degree of the guide point is added to the received image data, and the received image data is stored in the storage position of the storage device 21 which is determined depending on the image conditions (step S50). In step S50, just like the case of the changed target objects, the received image data is stored in this storage position, instead of the existing image data in the storage position read in step S47. If the clarity of the image of the received image data is not more than the clarity of the image of the existing image data, the existing image data in the storage position read in step S47 remains in that storage position.

Since the images in the guide point are managed by the server 2, an increase in cost of the terminal device can be prevented. Because images are shared by all users, it is possible to guide a driver who goes to a new location, with an actual picture in advance.

The image of the guide point in the storage device 21 of the server 2 is always updated to the latest image, so that the image of the guide point provided to each vehicle is the most recent image, and the driver and/or passenger(s) can recognize the status of the guide point by the latest image before the vehicle approaches the guide point. Accordingly, the driver can comfortably drive even if he or she is driving the route for the first time.

In the above described embodiment, the route up to the destination of the vehicle is set up, and the image of the next guide point on that route is displayed. Alternatively, the image of the next guide point on the currently traveling route may simply be displayed.

In the above described embodiment, the on-vehicle terminal device includes the distance detection means, image request generation means, display means and display control means, and the server includes the storage means and the transmission means, but the distance detection means and the image request generation means may be disposed outside the vehicle.

In the above described embodiment, the mobile body is the vehicle, but the mobile body may be a pedestrian. In the above described embodiment, the image conditions are the position of the vehicle, heading direction of the vehicle, guide point, time, weather and season, but the present invention is not limited to these. Condition items other than these may be included, or one or more condition items may be omitted.

As described above, according to the present invention, image data need not be stored in a device on a mobile body, such as an on-vehicle navigation device, so that displaying the image of a guide point before the mobile body approaches the guide point can be implemented by a low cost device provided on a mobile body.

The present invention can be applied to an on-vehicle navigation device or to a navigation device for a pedestrian.

The present invention is based on Japanese Patent Application No. 2004-104387 filed on Mar. 31, 2004, and the entire disclosure thereof is incorporated herein by reference.

The invention claimed is:

1. A routing guide system for displaying an image of a predetermined guide point along a road being traveled by a mobile body, said routing guide system comprising:
    a storage device installed outside said mobile body, for storing data of images at a plurality of guide points;
    a distance detection module in a processor, for detecting a distance from a current position of said mobile body to a next guide point;
    an image request generation module in said processor, for making an image request for said next guide point when the distance detected by said distance detection module becomes a first predetermined distance or less;
    a communication relay device installed outside said mobile body, for receiving an image of said next guide point retrieved from said storage device in response to said image request, and transmitting the image to said mobile body; and
    a display control module, for causing said mobile body to receive the image transmitted from said communication relay device and causing a display device to display the image,
wherein:
    said mobile body comprises a vehicle,
    said distance detection module and said image request generation module are installed in a terminal device mounted in said vehicle, along with said display device and said display control module,
    said storage device and said communication relay device comprise elements of a system including a server, installed outside said vehicle,
    a camera is provided in said terminal device,
    said terminal device further comprises a radio device for sending an image in front of the vehicle captured by said camera to said server along with additional information comprising the current position of said vehicle, a heading direction of said vehicle, and said next guide point, when the distance detected by said distance detection module becomes not more than a second predetermined distance that is shorter than said first predetermined distance, and
    said server comprises:
        a receive module, for receiving the image and additional information transmitted from said radio device of said terminal device via said communication relay device;
        an image judgment module, for determining whether an image that satisfies image conditions including the current position, heading direction, and guide point, specified in the additional information received by said receive module, is stored in said storage device;
        a set of storage instructions, for storing the data of image received by said receive module into said storage device when said image judgment module determines that the image that satisfies said image conditions in not found in said storage device;
        an identification degree setting module, for setting an identification degree of a guide point indicated by an image received by said receive module according to said received image;
        a target object judgment module, for applying a matching process between the existing image stored in said storage device and said received image when said image judgment module determines that the image satisfying said image conditions exists in said storage device, so as to determine whether a target object at the guide point has changed; and
        a set of storage instructions, for storing data of said received image into said storage device if said target object judgment module determines that the target object at the guide point has changed.

2. The routing guide system according to claim 1, wherein said image request includes the current position of said mobile body, a heading direction of said mobile body, and the next guide point as information.

3. The routing guide system according to claim 2, wherein said terminal device further comprises a route setting module in said processor, for setting a route from the current position of the vehicle to a destination, and said distance detection module measures the distance from the current position of the vehicle to the next guide point on the route being set by said route setting module.

4. The routing guide system according to claim 2, wherein said terminal device further comprises said camera, for capturing the image in front of the vehicle, and said display control module causes said display device to display the image in front of said vehicle captured by said camera when the distance detected by said distance detection module becomes not more than a third predetermined distance that is shorter than said first predetermined distance.

5. The routing guide system according to claim 1, wherein said server further comprises:
- an identification degree judgment module for determining whether an identification degree of said received image is higher than the identification degree of said existing image if said target object judgment module determines that the target object at the guide point has not changed; and
- a set of storage instructions, for storing data of said received image in said storage device if said identification degree judgment module determines that the identification degree of said received image is higher than the identification degree of said existing image.

6. A server for managing an image of a predetermined guide point along a road being traveled by a vehicle, said server comprising:
- an interface to a storage device;
- a receiving module for receiving an image from a terminal device provided in the vehicle;
- an identification degree setting module for setting an identification degree of a guide point indicated by the image received by said receiving module according to said received image;
- a target object judgment module for applying a matching process between an existing image stored in said storage device and said received image, when an image satisfying an image condition exists in said storage device, so as to determine whether a target object at the guide point has changed, said image condition being included in additional information appended to said received image; and
- a set of storage instructions, for storing data of said received image in said storage device together with the identification degree of the guide point, if said target object judgment module determines that the target object at the guide point has changed.

7. The server according to claim 6, further comprising:
- an identification degree determination module for determining whether an identification degree of the received image is higher than an identification degree of the existing image, if the target object judgment means determines that the target object at the guide point has not changed; and
- a set of storage instructions, for storing data of said received image in said storage device together with the identification degree of the guide point, if said identification degree determination module determines that the identification degree of the received image is higher than the identification degree of the existing image.

8. The server according to claim 6, wherein said image condition includes a current position of said vehicle, a heading direction of said vehicle, and the guide point.

9. The server according to claim 6 further comprising an interface to a communication relay device for receiving an image of a next guide point retrieved from the storage device, said communication relay device transmitting the image of the next guide point to said terminal device in response to an image request generated from said terminal device, when a distance from the current position of said vehicle to the guide point is within a first predetermined distance.

10. The server according to claim 9, wherein the image received by said receiving module from said terminal device comprises an image in front of said vehicle captured by a camera provided at said terminal device, when the distance from the current position of the vehicle to the next guide point is within a second predetermined distance which is shorter than said first predetermined distance.

11. The server according to claim 6, further comprising a set of storage instructions, for storing data of said received image in said storage device together with the identification degree of the guide point, if the image satisfying the image condition does not exist in the storage device.

* * * * *